July 10, 1945.  A. E. W. JOHNSON ET AL  2,380,313
REPAIR APPARATUS FOR VEHICLES
Filed Jan. 16, 1943  3 Sheets-Sheet 1
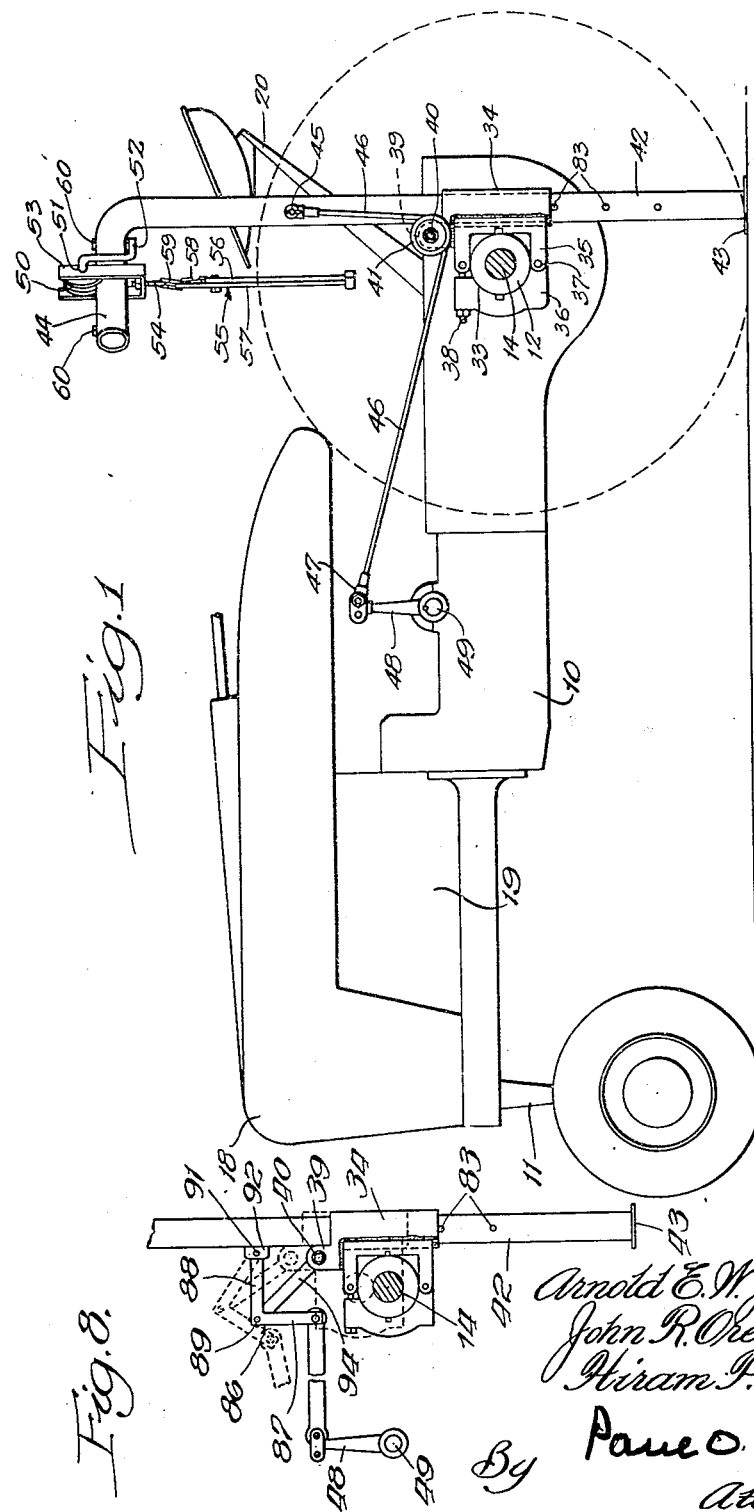

July 10, 1945. A. E. W. JOHNSON ET AL 2,380,313
REPAIR APPARATUS FOR VEHICLES
Filed Jan. 16, 1943 3 Sheets-Sheet 2
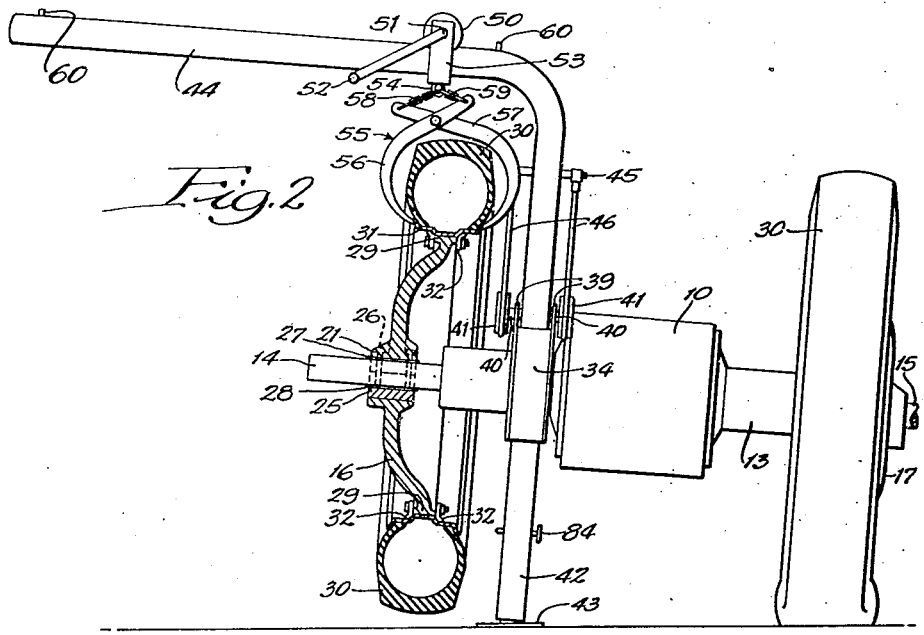
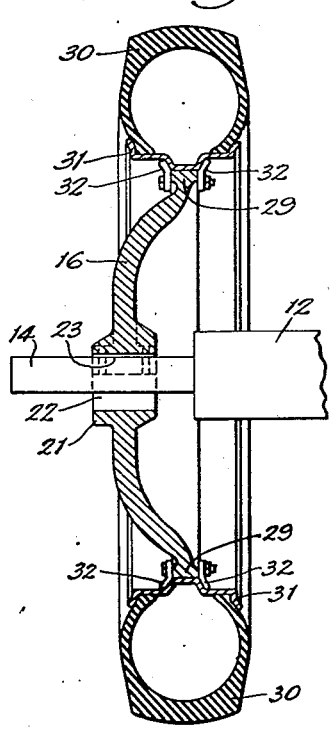
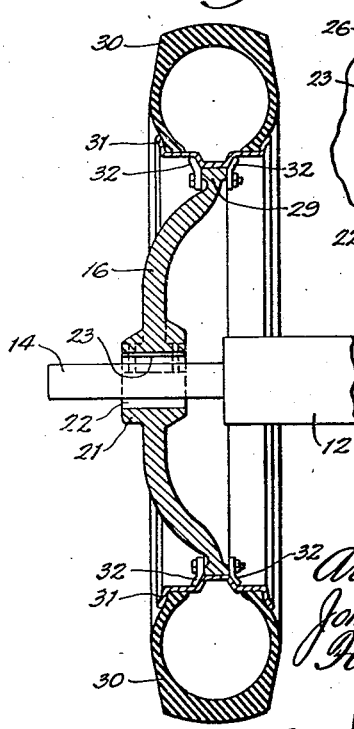
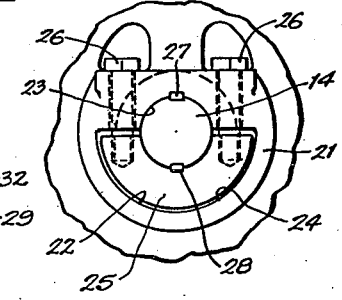
Inventors:
Arnold E. W. Johnson,
John R. Orelind &
Hiram P. Smith,
By Paul O. Pippel
Attorney.

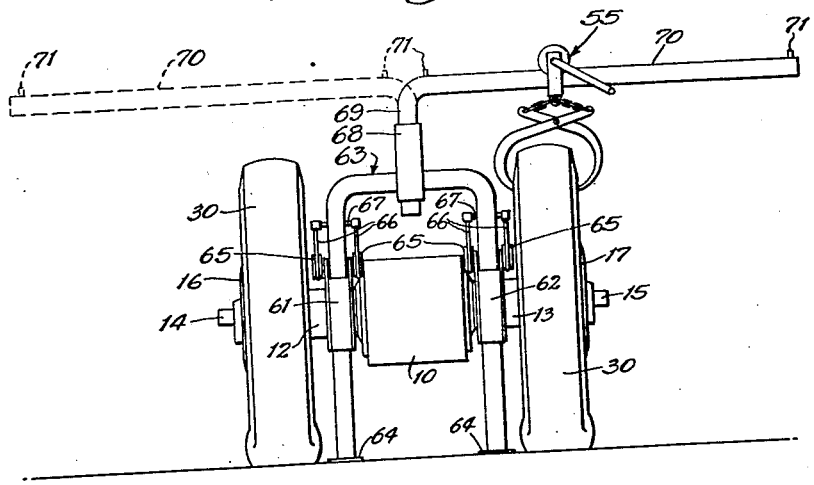
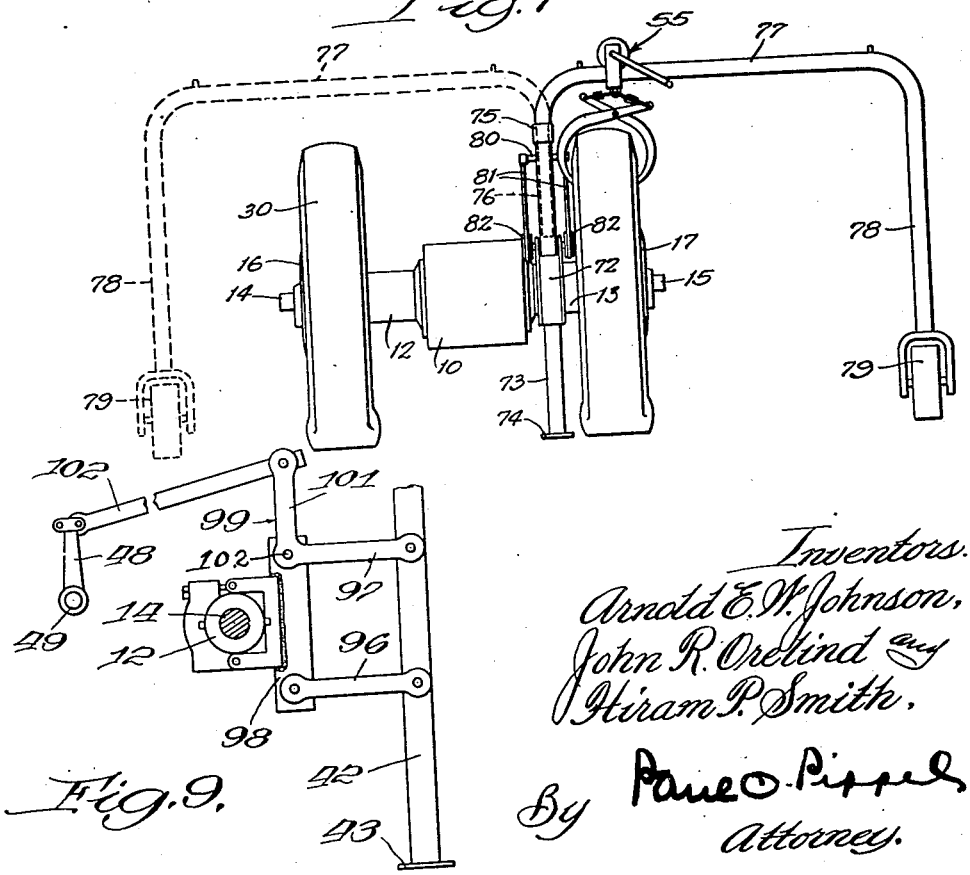

Patented July 10, 1945

2,380,313

UNITED STATES PATENT OFFICE 2,380,313

REPAIR APPARATUS FOR VEHICLES

Arnold E. W. Johnson, Oak Park, John R. Orelind, Wilmette, and Hiram P. Smith, Canton, Ill., assignors to International Harvester Company, a corporation of New Jersey Application January 16, 1943, Serial No. 472,610

12 Claims. (Cl. 214—1)

This invention relates to a repair and maintenance apparatus for vehicles and more particularly to an apparatus for removing and installing tires and/or wheels of vehicles.

Although the principles of the invention are applicable to the aforementioned and other problems in vehicles in general, a preferred form of the invention is particularly adapted for use in the removing and switching of tires and/or wheels in agricultural tractors. As is well known to those skilled in the art, a tractor of this type generally has large drive wheels mounted for transverse adjustment and interchangeability on the transverse drive axles of the tractor. Experience has shown that the removing and changing of the tires or wheels or both can become a complicated task, principally because of the size and weight of the parts to be handled and because of the additional adjustments provided by interchangeability of the tires to opposite sides of the wheels.

The principal object of the present invention is to provide an apparatus particularly adapted for the removing, changing and installation of the tires and/or wheels of an agricultural tractor.

It is a further and important object to adapt the principles of the invention to an apparatus capable of use for the removing, changing and installation of other parts of vehicles of any type.

Another object is to provide means for supporting the tractor in raised position together with means for carrying a removable or installable part of a vehicle.

Another object is to provide power-operated means for raising the vehicle and particularly to operate this means by power derived from the vehicle.

Another object is to provide a support for the raised vehicle having carrying means that may be positioned with respect to several removable parts of the vehicle.

Other objects and desirable features of the invention will become apparent as the disclosure is more fully made in the following detailed description and accompanying sheets of drawings, in which:

Figure 1 is a side elevational view of an agricultural tractor shown with a preferred form of the invention;

Figure 2 is a rear elevational view of the structure shown in Figure 1, the view showing one of the wheels in section;

Figures 3 and 4 are similar sectional views showing different stages of the removal or installation of a wheel from its axle;

Figure 5 is a fragmentary view on an enlarged scale of a portion of the wheel, showing the means for securing the wheel to the axle;

Figures 6 and 7 are views similar to Figure 1 but illustrating respectively two modified forms of the invention; and Figures 8 and 9 are modified forms of the invention.

The tractor chosen for the purposes of illustration is of the agricultural type and comprises a main body 10 carried at its front end on a wheeled truck 11 and provided at its rear end with a transverse rear axle structure including opposite, transversely extending axle housings 12 and 13. These housings respectively journal axles 14 and 15. The axle 14 has mounted thereon a traction wheel 16, and the axle 15 carries a similar wheel 17. The forward portion of the body 10 includes a radiator and grille structure 18 that encloses the tractor engine or power plant 19. An operator's station 20 is carried at the rear of the body 10. As best shown in Figure 2, the wheels 16 and 17 are respectively mounted on the axles 14 and 15 for transverse adjustment. Since both wheel structures and the mountings thereof are identical, the following description will pertain to the left-hand wheel 16.

The wheel 16 includes a hub 21 formed with an opening 22. The opening has a first, small semicylindrical portion 23 that fits a semicylindrical portion of the axle 14. The other portion of the opening is substantially larger and also semicylindrical, as at 24. The opening is filled by a C-shaped mounting member 25 having an interior semicylindrical portion complementary to the semicylindrical portion 23 and fitting the other side of the axle 14. The mounting member 25 is held in place to secure the wheel 16 to the axle 14 by a plurality of bolts 26. The interior of the surface 23 and the interior surface of the member 25 are provided respectively with keys 27 and 28 to establish the driving relation between the axle 14 and the wheel 16.

It will be noted from an examination of Figures 2, 3, and 4 that the wheel 16 is concave or dished to one side to provide an annular edge or rim-supporting portion 29. It will be noted that the plane of this edge and a plane through the center portion of the hub are axially offset. This arrangement provides that the wheel 16 may be mounted on the axle 14 in either the position shown or in a reversed position, in the latter case the rim portion 29 being offset laterally outwardly of the hub of the wheel. A pneumatic tire 30 mounted on a rim 31 is carried by the rim-supporting portion 29 of the wheel 16. The rim 31 is held in place on the wheel by a plurality of pairs of lugs or clamps 32. These lugs are removable to permit removal of the tire and rim assembly from the wheel.

The bolts 26 that mount the hub on the wheel on the axle may be loosened or tightened to permit transverse positioning of the wheel on the axle. The same result is attainable in the mounting of both wheels so that several treads or distances between the wheels may be obtained. The reversibility of each wheel with respect to its axle provides additional treads.

Most traction tires of the type used on agricultural tractors have a tread pattern including lugs disposed at angles to the line of travel of the vehicle. Best results are obtained in the use of this type of tire when the tire is run with the lugs inclining forwardly and inwardly toward the median plane of the tire, as viewed from the top of the tire. Consequently, when a wheel equipped with a tire of this type is reversed on the axle, the inclination of the lugs is incorrect, requiring that the tire be reversed on the wheel. It will, accordingly, be seen that the removing and interchanging of one or both of the wheels and tires presents a rather complicated task. However, this task is simplified by the use of apparatus embodying the present invention, as will be seen from the description below.

Each of the axle housings 12 and 13 is provided adjacent its inner end with a substantially square or rectangular mounting portion 33. In the form of the invention shown in Figures 1 and 2, the portion 33 serves as means for the attachment to the axle housing 12 of a unit apparatus for raising the tractor and for the changing of the tires and/or wheels thereof. As best shown in Figure 1, a vertical sleeve 34 is rigidly though removably secured to the portion 33 of the axle housing 12, the securing means preferably comprising a pair of complementary clamp sections 35 and 36 pivoted together at 37 and removably secured together by a swinging bolt and nut assembly 38. The sleeve 34 is rigidly secured, as by welding, to the clamp section 35. The sleeve and/or clamp section 35 carry a pair of upstanding plates 39, which journal a short transverse shaft 40. Opposite ends of the shaft carry guides in the form of pulleys or rollers 41.

The means for supporting the tractor and for raising the tractor preferably comprises a vertical standard 42 having a base 43 resting upon the ground. The vertical portion of the standard slidably passes through the sleeve 34, and its upper end is bent laterally to provide a boom 44. A portion of the standard 42 between the sleeve 34 and the boom 44 is provided with a transverse stud 45 that extends at opposite sides of the standard to provide a pair of connecting portions for the connection of the ends of a pair of flexible elements in the form of cables or the like 46. Each cable passes downwardly and is trained under a respective roller 41, the cable then extending forwardly and having its forward end provided with a connecting element 47. Each element is connected to an arm 48 keyed to a rock-shaft 49 journaled transversely of an intermediate portion of the tractor body 10. Mechanism, not shown, is housed within the intermediate portion of the tractor body and is driven by the tractor power plant 19 to swing the arm 48 forwardly and rearwardly about the axis of the rock-shaft 49. In this manner, power-operated means deriving power from the tractor power plant is provided for operating the means for raising the tractor. It will be understood, of course, that the power-operated means may be replaced by any other similar means, such as those illustrated in Figures 8 and 9.

The device of Figure 8 employs the sleeve 34 to which the vehicle axle 14 is rigidly attached, as heretofore described. However, instead of employing a flexible member, such as 46 in Figure 1 which acts to lift the vehicle and sleeve on the standard 42, levers may be utilized to accomplish the same result. The bell-crank lever 86 has angularly spaced arms 87 and 88 joined by the fulcrum 89. The arm 88 is pivotally attached at 91 to an apertured lug 92 on the standard 42, and the arm 87 is pivotally attached to the connecting rod 93 which in turn is pivotally attached to the arm 48 actuated by the rock-shaft 49. A link 94 pivotally connects the fulcrum 89 of the bell-crank 86 to the shaft 40 on the lug 39, which is an integral part of the sleeve 34. The levers, as just described, may be a single set or may be arranged in pairs to increase the strength of the jack of this invention similarly to the pair of flexible members employed in Figure 1. In order to obtain a clearer understanding of the operation of the device the resultant upward position is shown in dashed lines in the drawings.

Figure 9 shows a still further modification of jack means that may be employed wherein no sliding member is present. A pair of parallel links 96 and 97 is spaced apart and pivotally attached to the standard 42. The other ends of the links 96 and 97 are pivotally joined by the link 98 forming a part of the axle housing 12. The link 97 forms one arm of a bell-crank 99, which has another angularly spaced arm 101. The fulcrum of the bell-crank 99 is the pivot point for the link 98 as shown at 104. The upper end of the arm 101 has pivoted thereto an arm 102, which is attached to the rock-shaft 49 by the link 48. Upon movement of the link 48 in a rightward direction, the standard 42 is forced downwardly, and inasmuch as it is on the ground, the sleeve and the unitary vehicle move upwardly with respect to the standard 42.

It will be noted that the boom 44 extends laterally at a level above the top of the wheel 16. This permits the boom to carry means for supporting the tire and/or wheel. The boom, as shown, is integral with the upright standard, but it is readily seen that the boom may be made separately. This carrying means preferably takes the form of a roller 50 having a shaft 51 therethrough terminating in a crank 52. A bail 53 is carried by the shaft 51 and has its bight portion disposed below the boom 44 and provided with an eye-bolt 54. The means for connecting the bail 53 to the tire and wheel assembly or to the tire alone preferably takes the form of a pair of tongs 55 comprising elements 56 and 57. As best shown in Figure 2, it will be noted that the pivot between the elements 56 and 57 is directly below the roller 50, and that the vertical line between these two points is laterally offset toward the concavity of the wheel 16. The arms of the elements 56 and 57 that extend beyond the intersection thereof are connected to the eye-bolt 54 preferably by means of a pair of flexible chains 58 and 59. The chain 59 is somewhat shorter than the chain 58, thus assisting in the lateral offset location of the tong assembly with respect to the wheel assembly. The other ends of the tong elements 56 and 57 are adapted to engage opposite flanges of the rim 31. Turning of the crank 52 causes the carrier assembly to move laterally inwardly or outwardly on the boom 44, and when the wheel 16 is loosened from the axle 14, the wheel assembly is carried along. In the event that it is necessary to remove only the tire and rim assembly from the wheel, the carrier serves to carry this assembly. Because of the eye-bolt 54, the wheel assembly or part thereof supported by the carrier may be turned about the vertical axis of the eye-bolt, so that the wheel assembly or part thereof may be reversed with respect to the former position thereof. The upper surface of the boom is provided with a pair of spaced stops 60 to prevent the roller 50 from running off the boom.

In the modification shown in Figure 6, the raising and supporting apparatus is modified so that it may be attached to both sides of the tractor. The tractor and the parts thereof correspond to previous illustrations, and corresponding reference characters designate similar parts. In this form of the invention, each of the axle housings 12 and 13 has mounted thereon a vertical sleeve, these sleeves being designated at 61 and 62. The means for mounting the sleeves on the axle housings may be identical to that shown and described in connection with Figure 1. The supporting means comprises an inverted U 63 preferably of tubular cross-section, having its legs provided with base plates 64 engaging the ground. The sleeves 61 and 62 respectively carry rollers or pulleys 65 about which are trained flexible elements in the form of cables 66. One end of each cable is connected to one of a pair of transverse studs 67 respectively carried by the legs of the standard. The other ends of the cables are connected to means for drawing the cables around the under portions of the pulleys for raising the tractor. The means for accomplishing this result may be identical to that set forth with respect to Figure 1, in this case the rock-shaft 49 being equipped with additional arms 48 to accommodate the several cables.

The intermediate portion of the bight of the U 63 carries rigidly thereon a vertical sleeve 68. This sleeve provides a bearing for a vertical portion 69 of a transversely extending boom 70. The boom is swingable about the vertical axis of the sleeve 68 for positioning of the boom at either side of the tractor so that a tire or wheel removed from one side of the tractor may be carried by the boom to the other side of the tractor for installation thereat. In the form of the invention just described, the raising means is so arranged as to lift either or both sides of the tractor.

The means for carrying the tire and/or wheel on the boom 70 may be identical to that shown in Figure 2, and accordingly, this means in Figure 6 is designated simply by the reference character 55. The boom 70 is equipped with a pair of laterally spaced stops 71 for the purpose previously set forth.

In the form of the invention shown in Figure 7, the apparatus is similar in many respects to that shown in Figures 1 and 2 and at the same time embodies some of the characteristics of the modification shown in Figure 6. The tractor and the parts thereof correspond to those previously shown and described. In Figure 7 the axle housing 13 is provided with a sleeve structure 72 similar to the sleeve structures 34 and 62, previously described. A vertical standard 73 carried on a base 74 extends slidably through the sleeve 72 and is provided at its upper end with a secondary sleeve or ferrule 75. The standard 73 is preferably tubular in cross-section and thus provides at its upper end a vertical interior bearing for the downwardly extending end 76 of a transverse boom 77. The other end of the boom is turned downwardly into a vertical leg 78, the lower end of which is supported on a rolling element in the form of a ground wheel 79. It will thus be seen that the boom 77 may be swung about the axis of the standard 73 to positions at opposite sides of the tractor, the boom being supported additionally on the wheel 79.

The standard 73 is provided adjacent its upper portion with a transverse stud 80, to the opposite ends of which are connected ends of cables 81. These cables are trained about rollers or pulleys 82 carried on a transverse shaft on the sleeve structure 72 and are then connected to means for drawing the cables about the pulleys for raising the tractor. The means for accomplishing this result may be the same as that shown and described in connection with Figure 1. The carrier means for supporting the tire and/or wheel on the boom while being changed may be identical to that shown and described in connection with Figure 2, and accordingly, the carrier in Figure 7 is designated only by the numeral 55.

In the operation and use of the apparatus shown in Figures 1 and 2, power from the engine is transmitted through the rock-shaft 49 and arm 48 to the cable 46, the result being that one side of the tractor is raised. The tractor is maintained in this raised position upon cessation of movement of the arm 48, although the tractor may be further supported in raised position by the insertion of a pin, or the like, between the sleeve 34 and the standard 42, the standard being provided with a plurality of transverse openings 83 for this purpose. One such pin is indicated at 84 in Figure 2. In the event that the entire wheel assembly is to be removed from the axle 14, the carrier, including the tong assembly 55, is positioned above the wheel and the elements 56 and 57 are disposed to connect the carrier to the wheel. The C-shaped hub member 25 (Figure 5) is removed and the wheel assumes the position on the axle shown in Figure 3. It is preferable that the operator turn the wheel by hand to such a position that the hub member 25 is at the under side of the axle 14. With the tractor and apparatus in this position, the tractor is lowered slightly, the wheel in the meantime being maintained at its original level by the carrier assembly on the boom 44. At this time the axle 14 assumes the position shown in Figure 4, the axle being then loosely associated with the opening 22 in the wheel. It is now a very simple matter to move the carrier assembly outwardly on the boom 44.

When the wheel is reinstalled, the foregoing procedure is followed in reverse order. The axle having been maintained in its aforesaid position passes easily through the opening 22 in the hub of the wheel 16. Of course, the wheel is positioned so that the axle engaging portion 23 is at the upper side of the axle. The arm 48 is moved forwardly to raise the tractor so that the axle engages this under surface 23. The wheel is now supported on the axle instead of on the carrier unit as before, and the member 25 may be easily reinserted between the axle and the larger semi-circular opening 22.

The tong unit is particularly adapted for the removal of the tire 30 and rim 31 from the wheel 16, inasmuch as the tong elements 56 and 57 engage opposite sides of the rim 31 and do not completely pass through the wheel 16. When it is desirable to remove the tire from the wheel, the procedure consists only of a removal of the lugs 32 and movement of the tire and rim away from the wheel by means of the carrier assembly on the boom 44. The tire may be just as easily reinstalled. It will be understood, of course, that the tong unit 55 may be suitably replaced by any equivalent structure, such as a chain or the like passed through the spokes of the wheel 16.

The use of the apparatus shown in Figure 6 or Figure 7 follows that set forth above. In both of the last-mentioned figures, however, the booms 70 or 77 are swingable from one side of the tractor to the other, for the purpose hereinbefore described.

It will be seen that the preferred forms of the invention achieve in a desirable manner the objects hereinbefore enumerated. Other objects and features of the invention will undoubtedly suggest themselves to those skilled in the art. It will be appreciated that the foregoing disclosure is only illustrative, and it is not intended thereby to limit the scope of the appended claims.

What is claimed is:

1. Repair apparatus for the changing of tires or wheels of a vehicle: comprising a support connected to the vehicle; means on the support for raising the vehicle; and means on the support for temporarily carrying a removed tire or wheel of the vehicle in a position adapting said tire or wheel for reinstallation on the vehicle while the vehicle is raised on the support.

2. Repair apparatus for the changing of tires or wheels of a vehicle having a power source: comprising a support; means on the support for raising the vehicle; means for operating the raising means from the vehicle power source, and means on the support for temporarily carrying a removed tire or wheel in a position adapting said tire or wheel for reinstallation on the vehicle.

3. Repair apparatus for the changing of tires or wheels of a vehicle: comprising a support; means on the support for raising the vehicle; means on the support for temporarily carrying a removed tire or wheel in a position adapting said tire or wheel for reinstallation on the vehicle; and means mounting the carrying means movably on the support for positioning of the carrying means for the changing of two or more wheels or tires of the vehicle.

4. Repair apparatus for the changing of tires or wheels of a vehicle having a power source: comprising a support; means on the support for raising the vehicle; means for operating the raising means from the vehicle power source, means on the support for temporarily carrying a removed tire or wheel in a position adapting said tire or wheel for reinstallation on the vehicle; and means mounting the carrying means movably on the support for positioning of the carrying means for the changing of two or more wheels or tires of the vehicle.

5. For a vehicle having a transversely removable and installable wheel part: a repair apparatus; comprising a support; means for securing the support to the vehicle; a vertical standard; a transverse boom carried at one end at an upper portion of the standard; means for supporting the other end of the boom from the ground; means movable along the boom in the direction of removal or installation of the wheel part; and means adapted to connect the movable means and the wheel part for carrying said wheel part by and along the boom upon removal or installation of said wheel part.

6. For a vehicle having a transversely removable and installable wheel part: a repair apparatus, comprising a support; means for securing the support to the vehicle; a vertical standard; a transverse boom carried at one end at an upper portion of the standard for swinging about a vertical axis with respect to the vehicle; means for supporting the other end of the boom from the ground; means movable along the boom in the direction of removal or installation of the wheel part; and means adapted to connect the movable means and the wheel part for carrying said wheel part by and along the boom upon removal or installation of said wheel part.

7. For a vehicle having a plurality of transversely removable and installable wheel parts: a repair apparatus, comprising a support; means for securing the support to the vehicle; a vertical standard; a transverse boom carried at one end on the standard for movement of the boom to various positions with respect to the vehicle wheel parts; means including a rolling element for supporting the other end of the boom from the ground; means movable along the boom, in a selected position of the boom, in the direction of removal or installation of a wheel part; and means adapted to connect the movable means and a wheel part for carrying said wheel part upon removal or installation of said wheel part.

8. Tire or wheel changing apparatus for a vehicle having an axle structure including a vehicle supporting wheel at each end thereof, said apparatus comprising an upright standard resting on the ground and including an attaching part for connection to said axle structure, said standard extending upwardly well above the axle structure, means on the standard for raising the vehicle, said standard serving to support the vehicle when a wheel or tire thereof is removed, a boom part included in the upper end of the standard, and wheel or tire carrying means mounted on the boom part for movement therealong.

9. Tire or wheel changing apparatus for a vehicle having a body structure including a pair of supporting traction wheels, said apparatus comprising a substantially vertical narrow standard, said standard adapted to be journaled for vertical reciprocal movement on and with respect to said body structure, means for raising the vehicle on the standard, said standard extending upwardly above the vehicle body structure and having a transversely extending boom at the upper end thereof, and means on the boom for carrying a wheel or tire removed from the vehicle, whereby the standard serves to support the vehicle when a wheel is so removed and being carried by the boom at the upper end of the standard.

10. Tire or wheel changing apparatus for a vehicle having a body structure including a pair of supporting traction wheels, said apparatus comprising a substantially vertical narrow standard, said standard adapted to be journaled for vertical reciprocal movement on and with respect to said body structure, power means on the vehicle for raising the vehicle on the standard, said standard extending upwardly above the vehicle body structure and having a transversely extending boom at the upper end thereof, and means on the boom for carrying a wheel or tire removed from the vehicle, whereby the standard serves to support the vehicle when a wheel is so removed and being carried by the boom at the upper end of the standard.

11. Tire or wheel changing apparatus for a vehicle having a body structure including a pair of supporting traction wheels, said apparatus comprising a substantially vertical narrow standard, said standard adapted to be journaled for vertical reciprocal movement on and with respect to said body structure, means for raising the vehicle on the standard, said standard extending upwardly above the vehicle body structure and having a transversely extending boom at the upper end thereof, means on the boom for carrying a wheel or tire removed from the vehicle, said standard journaled at a point substantially midway between the pair of supporting wheels, whereby the standard serves to support the vehicle when either or both wheels are removed.

12. Tire or wheel changing apparatus for a vehicle having a body structure including a pair of supporting traction wheels, said apparatus comprising a substantially vertical narrow standard, said standard adapted to be journaled for vertical reciprocal movement on and with respect to said body structure, means for raising the vehicle on the standard, said standard extending upwardly above the vehicle body structure and having a transversely extending boom at the upper end thereof, and means on the boom for carrying a wheel or tire removed from the vehicle, said boom having an outer ground support.

ARNOLD E. W. JOHNSON.
JOHN R. ORELIND.
HIRAM P. SMITH.